F. HORAK.
DRAFT ATTACHMENT.
APPLICATION FILED JAN. 12, 1916.
1,217,178.   Patented Feb. 27, 1917.
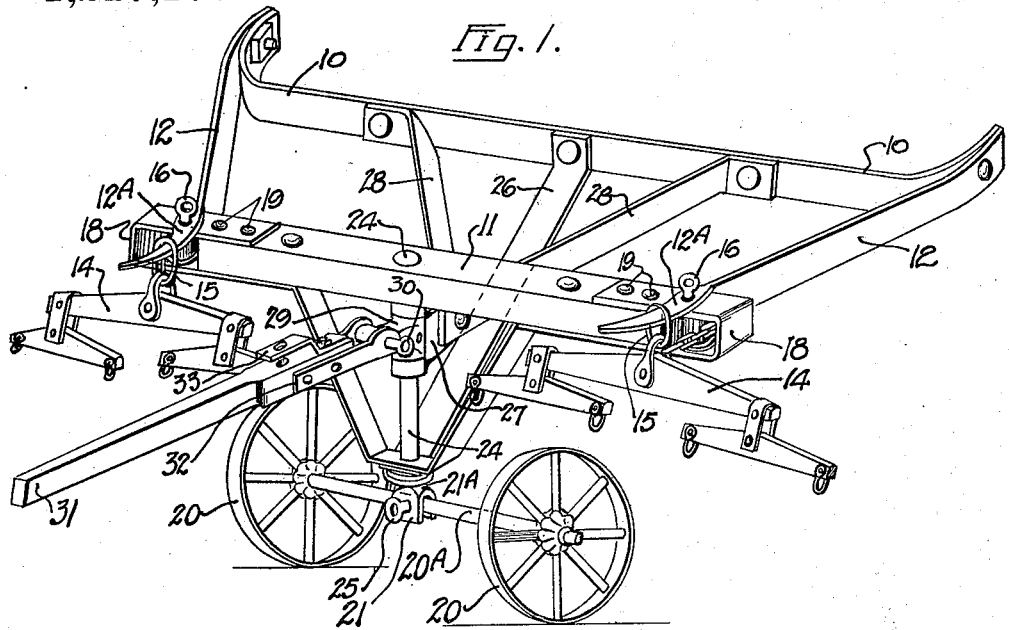
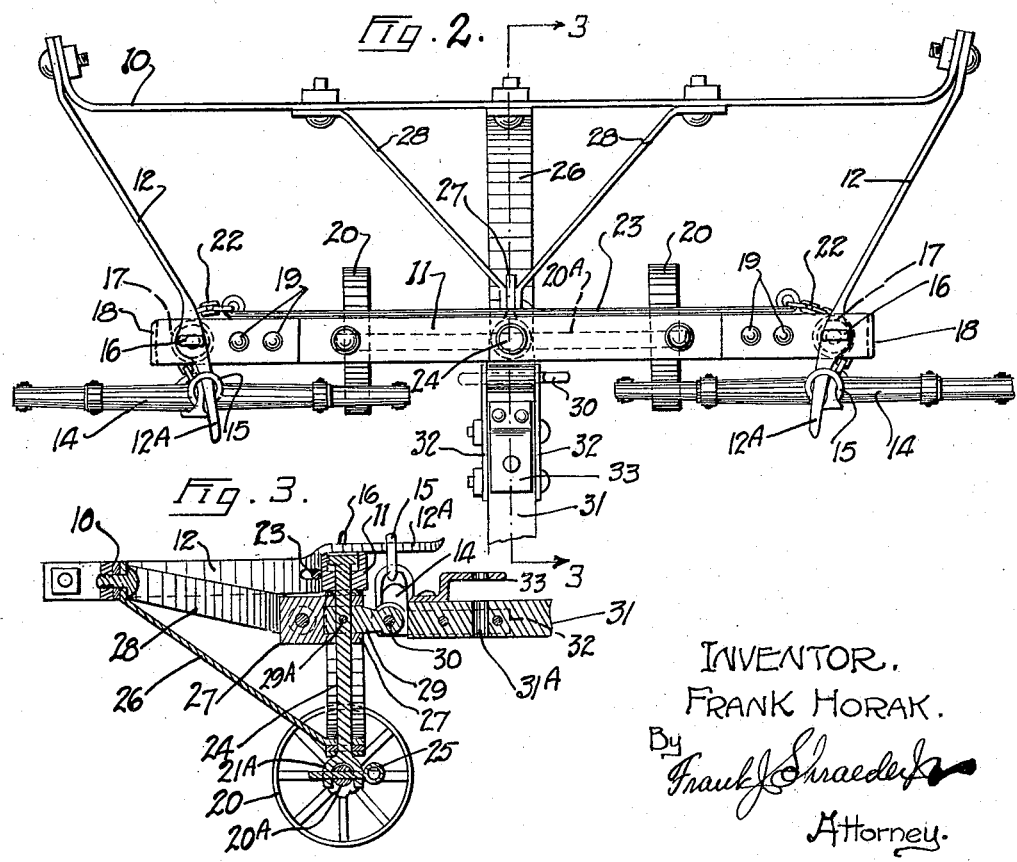
INVENTOR.
FRANK HORAK.
By
Frank J. Schraeder
Attorney.

UNITED STATES PATENT OFFICE.

FRANK HORAK, OF KULM, NORTH DAKOTA.

DRAFT ATTACHMENT.

1,217,178.   Specification of Letters Patent.   Patented Feb. 27, 1917.

Application filed January 12, 1916. Serial No. 71,639.

*To all whom it may concern:*

Be it known that I, FRANK HORAK, a subject of the Emperor of Austria-Hungary, residing at Kulm, in the county of La Moure and State of North Dakota, have invented new and useful Improvements in Draft Attachments, of which the following is a specification.

My invention relates to draft attachments for sowers, reapers, binders or the like and has among its objects to provide a simple and durable device which is adapted for use with four horses but also readily converted for use with only two horses in moving the machine.

It is also an object to provide an adjustable draft-attachment adapted for connection with frames of varying widths.

Other objects and advantages will be apparent from the following description when taken in connection with the accompanying drawings:

In the drawings:

Figure 1 is a perspective view of my invention.

Fig. 2 is a plan thereof.

Fig. 3 is a sectional view taken on line 3—3 of Fig. 2.

Referring particularly to the accompanying drawings, 10 indicates the frame of an agricultural implement to which my draft attachment is secured.

A relatively heavy cross bar 11, preferably of wood, is provided which is rigidly held by means of a pair of steel braces 12 which extend to the frame 10. The front end of bar 12 is bent and shaped as indicated by $12^A$ and pivotally connected with bar 11 by pin 16 and arranged to support the two horse swingle bar 14 in an ordinary ring 15. The pins 16 extend through the ends $12^A$ and also act as shafts for small sheaves 17 which are mounted within the steel housings formed by the strap 18 which is secured to cross bar 11 by means of rivets 19 and which is overhung and then bent downwardly and inwardly under cross bar 11 and the center of which is depressed to form a brace and extends down toward the shoulder $21^A$ of the pivotal support for the wheels 20.

The swingle bars 14 are interconnected by a pair of chains 22 and a steel bar 23 although a single chain could be substituted.

A heavy vertical pin 24 extends downwardly through the cross bar 11 and terminates with a forked end 21 which embraces the axle $20^A$, a pin or key 25 rigidly connecting them.

The forked end 21 of the pin 24 is braced by the brace bar 26 while the upper end is held by cross bar 11 and cast bearing 27 which is secured between the pair of brace bars 28.

Intermediate the cast bearing 27 and rigidly mounted on pin 24 by pin $29^A$ is a tongue-connecting member 29 which connects to the tongue 31 by means of the pin 30 and a pair of side bars 32.

The usual neck yoke (not shown) being attached to the end of the tongue.

It will be clearly understood, that any movement of tongue 31 will correspondingly move the wheels 20 both being rigidly interconnected.

The tongue 31 is provided with a hole $31^A$ and well known bent Z-bar 33 adapted to receive pin 16 and support any one of the two horse swingle bars when only two horses are desired for use.

It will also be understood that with the braces 12 pivotally mounted on pins 16, the ends may be attached to implements having frames 10 of various widths.

It is thought the foregoing specification and illustrations clearly disclose applicant's invention hence a more extended description is omitted.

I claim:

1. In a draft attachment, the combination of a tongue, a rigid stationary cross bar, a pair of pivotally mounted braces extending from the ends of said cross bar, a sheave mounted on each end of said cross bar, a pair of supporting wheels mounted on an axle, a vertical rotatable pin mounted within said cross bar, said axle and tongue having a rigid connection with said pin, a pair of two-horse swingle bars, and a flexible connection between said swingle bars passing over said sheaves.

2. In a draft attachment, the combination of a tongue, a rigid stationary cross bar, a pair of two-horse swingle bars, steel housings on the ends of said cross bar, a sheave in each housing, a flexible connection between said swingle bars passing over said sheaves, a pair of pivoted side braces extending from said housings and projecting to support said swingle bars, an axle, a pair of supporting wheels, and a vertical rotatable pin mounted in the center of said cross bar, said tongue and axle having rigid connection with said pin.

In witness whereof, I hereunto subscribe my name.

FRANK HORAK.

Copies of this patent may be obtained for five cents each, by addressing the "Commissioner of Patents, Washington, D. C."